United States Patent Office 3,163,671
Patented Dec. 29, 1964

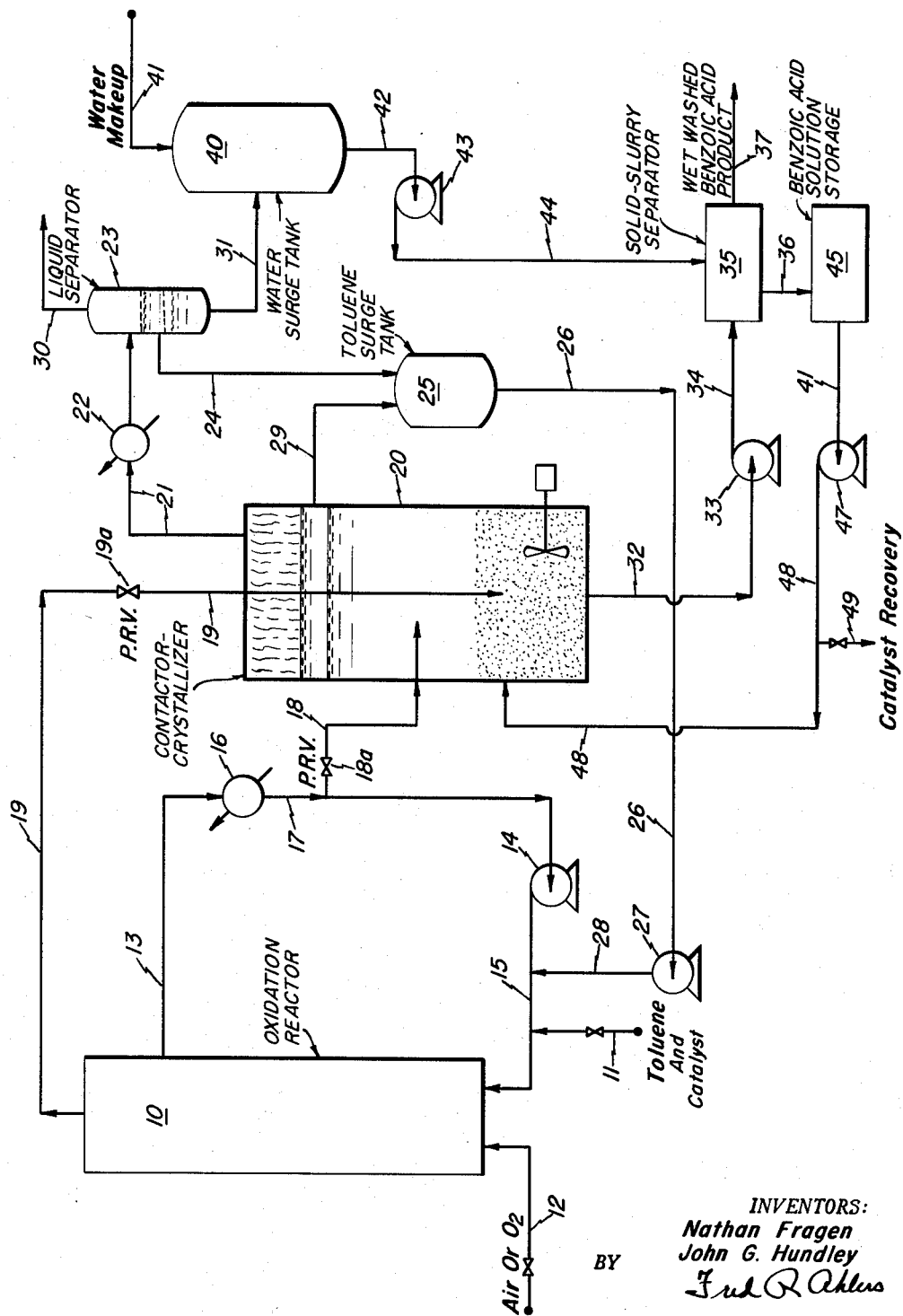

3,163,671
BENZOIC ACID RECOVERY BY CONTACTING GASIFORM AND LIQUID EFFLUENTS OF LIQUID PHASE OXIDATION WITH SATURATED AQUEOUS BENZOIC ACID
Nathan Fragen, Hammond, and John G. Hundley, Munster, Ind., assignors to Standard Oil Company, Chicago, Ill., a corporation of Indiana
Filed Feb. 6, 1961, Ser. No. 87,449
3 Claims. (Cl. 260—525)

This invention relates to a system for the manufacture of benzoic acid and more specifically pertains to an integrated system for oxidizing monoalkylbenzene hydrocarbons in the liquid phase and recovering benzoic acid product in a novel manner.

Monoalkylbenzene hydrocarbons can be oxidized in the liquid phase with molecular oxygen-containing gas such as commercial oxygen, pure oxygen, air, air fortified with oxygen and gases containing less oxygen than air such as air or oxygen diluted with nitrogen, flue gas or carbon dioxide, employing a catalyst containing a heavy metal. The presence of benzoic acid as a reaction medium in an amount of at least 10 percent based on the monoakylbenzene hydrocarbon will increase the oxidation reaction rate (utilization of oxygen) substantially without introducing a solvent which must be separated from the desired product and be separately recovered. As taught in U.S. Patent No. 2,963,509, the use of bromine as a component of the catalyst together with the use of benzoic acid as the reaction medium provides an exceedingly rapid oxidation reaction with high oxygen utilization and results in exceptionally high conversion of the aromatic feed stock to benzoic acid.

Benzoic acid is a useful compound not only as a preservative but also as a raw material for synthesis of phenol or caprolactam from which fiber-forming or moldable polyamides can be prepared. Benzoic acid is useful in the preparation of alkyds and plasticizers. Terephthalic acid can be prepared from benzoic acid by disproportionation and isomerization reactions carried out in a carbon dioxide atmosphere.

A conventional method for conducting liquid phase oxidation processes employing as the oxidant a gas containing molecular oxygen is to employ an oxidation reactor having a condenser, of either reflux or side arm type. A source of molecular oxygen such as air or commercial oxygen is passed into the liquid phase in the reactor and a gasiform mixture is withdrawn therefrom and passed into the condenser. The aromatic charge stock from the effluent gasiform mixture coming from the oxidation zone is condensed and returned to the reaction zone. In such a condensing system the formation of an explosive gaseous mixture of hydrocarbon and oxygen can form. The system of this invention overcomes this potential hazard in a novel manner.

The system of this invention includes an oxidation zone, a contacting-crystallization zone, conduit containing a pressure reducer for transferring gasiform mixture from the oxidation zone to the contacting-crystallization zone, conduit containing a pressure reducer for transfer of liquid effluent from the oxidation zone to the contacting-crystallization zone, conduit and pump for withdrawing a water-insoluble liquid from an upper layer in the contacting-crystallization zone for recycle to the oxidation zone, a separator, a liquid-solid separator, conduit and pump for transferring a slurry of benzoic acid crystals in an aqueous solution of benzoic acid to the separator, conduit and pump for recycle of the aqueous solution of benzoic acid to the contacting-crystallization zone and a conduit for discharge of uncondensed gases from the contacting zone. It is advantageous to pass the uncondensed gases from the contacting zone to a cooler, collect and separate the condensate into a hydrocarbon phase and an aqueous phase, and recycle the hydrocarbon phase to the oxidation zone and the aqueous phase to the contacting-crystallization zone. The oxidation zone can be provided by an adiabatic reactor with an external heat removal loop through which is circulated liquid taken from the oxidation zone and recycled to the oxidation zone together with fresh aromatic hydrocarbon feed stock, makeup catalyst and other recycle streams. The liquid effluent charged to the contacting zone can be withdrawn from the external heat removal loop. The oxidation zone also can be provided by an isothermal reactor where heat of reaction is removed by indirect heat exchange to maintain a substantially constant temperature. If desired, a portion of the liquid reaction medium can be circulated externally to provide for withdrawing liquid reactor effluent to be charged to the contacting zone and to provide for liquid effluent to be combined with streams recycled to the oxidation zone, fresh feed stock and makeup catalyst. Either of these reactors can be continuous tubes where the reaction mixture ingredients are charged into one end and a mixture of liquid and gaseous materials are withdrawn from the opposite end as a single stream or as two streams after passing through a liquid or gas separator. In either case both liquid and gasiform reaction zone effluents are charged to the contacting zone.

By "gasiform mixture," as herein employed, is meant a mixture of materials whose components comprise compounds which are normally gases such as nitrogen, oxygen, carbon dioxide and carbon monoxide and compounds normally liquid or solid such as water, monoalkylbenzene hydrocarbon, benzaldehyde, benzyl alcohol, and benzoic acid but which under reaction conditions are in the vapor state.

The system of this invention can be utilized with various liquid phase oxidation processes for producing benzoic acid by the oxidation of monoalkylbenzene hydrocarbon with a gas containing molecular oxygen such as air or commercial oxygen or gases containing more or less oxygen than air at temperatures of from 50° C. to 275° C. and pressures of from atmospheric (0 p.s.i.g.) to 1500 p.s.i.g., desirably employing a catalyst provided by a heavy metal compound; i.e., a compound of a variable valence heavy metal. Such compounds can be selected from oxides, hydroxides, inorganic and organic salts, organometallic derivatives of the metals of the group of heavy metals shown in the "Periodic Chart of Elements" appearing on pages 56 and 57 of the "Handbook of Chemistry," 8th edition, published by Handbook Publishers, Inc., Sandusky, Ohio, 1952. Suitable heavy metals are those having an atomic number of not greater than 84. However, some metals outside this group may be employed. More particularly, compounds of metals having an atomic number of from 23 to 28 inclusive are excellent catalysts. Particularly useful, as catalysts are compounds of manganese, cobalt, nickel, chromium, vanadium, molybdenum, tungsten, tin and cerium. The catalyst may be a compound of a single metal or a mixture of compounds of different metals. For example, cobalt and manganese compounds are useful to provide the heavy metal catalyst and mixtures of cobalt and manganese appear to provide a more efficient catalyst than the use of either alone. The use of such heavy metal oxidation catalysts is well known to those skilled in the art. The heavy metal compound providing the heavy metal oxidation catalyst should be sufficiently soluble in the reaction mixture to provide, of course, catalytically effective portions of the heavy metal. The precise amount of heavy metal catalyst to be used, as is known to those skilled in the art, is a matter of choice. Metals can be used per se, as salts of organic acids such as acetates, propionates, butyrates, caproates, cumates, benzoates, as organic complexes such as the acetylacetonates, the 8-hydroxy-quinolates and the ethylene diamine tetra-acetates as well as inorganic borates, halides and nitrates.

As hereinbefore stated, the catalyst system providing the highest reaction rate, most efficient consumption of molecular oxygen and the highest conversion of aromatic hydrocarbon feed stock to benzoic acid, is the catalyst system which comprises in conjoint presence a heavy metal oxidation catalyst and bromine. The bromine is added in elemental, combined or ionic form such as in hydrogen bromide, ammonium bromide, potassium bromate, tetrabromoethane, benzyl bromide and metal bromides. Any amount of bromine will enhance or promote the efficiency of the heavy metal oxidation catalyst. More specifically, the ratio of bromine to heavy metal can be as in the metal bromide as calculated, for example, in manganese bromide or it can range from 1 to 10 atoms of bromine per atom of metal or 1 to 7 atoms of metal per atom of bromine.

The amount of air or other source of molecular oxygen added to the oxidation zone will depend, of course, upon the desired conversion of monoalkylbenzene to benzoic acid. By increasing or decreasing the rate of air or other source of molecular oxygen introduced into the oxidation zone, the rate of conversion of the oxidizable aromatics to benzoic acid can be increased or decreased. For example, when the oxidation zone liquid effluent containing 70 parts of benzoic acid and 30 parts of toluene is being produced, an increase in rate of air input will result in a lower ratio of toluene to benzoic acid in the liquid effluent while decreasing the rate of air input will increase the ratio of toluene to benzoic acid in the liquid effluent.

In the contacting of the liquid and gasiform effluents from reactor 10 with the aqueous benzoic acid solution in contactor-crystallizer 20 several liquid phases may be present depending upon the temperature at which the crystallization is carried out. One liquid phase can, of course, be toluene. At about 90° C. benzoic acid and water can form two liquid phases: one is an aqueous solution of benzoic acid and the other is a solution of water in benzoic acid. These two liquid phases containing benzoic acid and water persist at temperatures above 90° C. An excess of benzoic acid over that to saturate the water and to form the solution of water in benzoic acid is present as a solid phase at temperatures below 122° C. The two water-benzoic acid liquid phases become one liquid phase at the critical solution temperature of about 117° C. The composition of the critical mixture is about one-third benzoic acid and two-thirds water on a weight basis. This phenomena has been reported by H. L. Ward and S. S. Cooper in J. Phys. Chem. 34, 1484 (1930). The formation of more than one benzoic acid-water liquid phase can be avoided, if desired, by operating the contacting-crystallization zone at a temperature below 95° C. or above 117° C. For the purposes of this invention it is preferred that the crystallization of benzoic acid be carried out at a temperature below 95° C., in the range of 25° C. to 90° C.

The accompanying drawing is a schematic illustration of the system of this invention for producing a benzoic acid product. The system is started up by charging to reactor 10, the lower portion of which is the oxidation zone, through valved conduit 11 and charging conduit 15, toluene containing manganese and cobalt benzoates (0.6 percent total metal benzoates) and 0.4 percent tetrabromoethane, all by weight based on the toluene, until reactor 10 is about one-half full. The solution is heated to 175° C. and 280 to 285 p.s.i.g. (about 21 atmospheres). Thereafter air is passed into the reaction mixture at 50 to 200 s.c.f.h. (standard cubic feet per hour) per pound of toluene taking the exit gas from reactor 10 through conduit 19 to contactor-crystallizer 20 through which is being circulated an aqueous solution saturated with benzoic acid from aqueous benzoic acid solution collection tank 45 by conduit 41, pump 47 and transfer conduit 48. Uncondensed gases are vented from contactor-crystallizer 20 through conduit 21 and cooler 22. The toluene in the condensate is collected in separator 23 and is withdrawn to toluene surge tank 25. After about 20 minutes additional toluene containing catalyst in the above amount is continuously added. The liquid effluent from reactor 10 is withdrawn by conduit 13 at about 220° C. to the heat exchanger 16 where it is cooled to about 170° C. to remove heat of reaction and then passes to conduit 17, pump 14 and charge conduit 15 until the external heat exchange loop is filled. Thereafter a portion of the circulating liquid reactor effluent is withdrawn through valved conduit 18 containing pressure reducing valve 18a and charged to contactor-crystallizer 20 into the aqueous benzoic acid solution. The liquid reactor effluent from this oxidation contains benzoic acid and toluene in the ratio of about 70 parts of benzoic acid to 30 parts of toluene. A toluene layer is withdrawn from contactor-crystallizer 20 by conduit 29 to toluene surge tank 25, combined with toluene from separator 23, taken through conduit 26 by pump 27 and charged through conduit 28 to charge conduit 15.

Benzoic acid crystallizes in contactor-crystallizer 20 from the liquid reactor effluent and gasiform effluent charged thereto. Benzoic acid crystals slurried in the aqueous benzoic acid solution are withdrawn from contactor-crystallizer 20 through slurry line 32 and slurry pump 33 and are charged through conduit 34 to separator 35 which may be a filter press, centrifugal filter, or any other means for separating solids from a slurry. The aqueous benzoic acid solution is withdrawn from separator 35 through conduit 36 to aqueous benzoic acid solution collection tank 45. Benzoic acid product recovered in separator 35 can be washed with recycle water charged through conduit 44. Washed benzoic acid product is withdrawn through line 37. The wash water may be collected and charged to contactor-crystallizer 20 to make up some of the water removed therefrom by the venting of uncondensed gases. Makeup water is added to water surge tank 40 through conduit 41. Catalyst in the recycle aqueous benzoic acid solution is prevented from building up by taking a purge stream from conduit 48 through valved purge conduit 49. The heavy metal values can be recovered by precipitating the metals as their oxides or hydroxides and then reconverting them to benzoates for recycle to the oxidation zone.

Continuous operation of the above system is carried out in the following manner in which the rates of flow are on an hourly basis. To oxidation reactor 10 there is added through charging conduit 15 a total of 39,035 pounds at 157° C. resulting from combining (a) 35,543 pounds of cooled liquid effluent at 170° C. from pump 14, (b) 2,390 pounds recycle toluene at 66° C. from conduit 28, and (c) 1102 pounds fresh toluene from valved conduit 11. Makeup catalyst is added with the fresh toluene to provide 0.6% metal benzoates and 0.4 tetrabromoethane based on the toluene present. The composite reaction charge contains:

| | Pounds |
|---|---|
| Toluene | 13,137 |
| Benzoic acid | 25,337 |
| Water | 561 |

Air at 300 p.s.i.g. is charged through conduit 12 at 76 pound moles per hour. The oxidation is conducted at 300 p.s.i.g.

Withdrawn from oxidation reactor 10 are gasiform effluent at 220° C. through conduit 19 containing 871 pounds toluene, 117 pounds benzoic acid, 139 pounds water, 60.7 pound moles of a mixture of $N_2$ and $O_2$ of about 1.0 mole percent oxygen; and 38,400 pounds liquid effluent at 220° C. through conduit 13 containing 11,324 pounds toluene, 26,470 pounds benzoic acid and 606 pounds of water together with catalyst. The liquid effluent is cooled to 170° C. at 300 p.s.i.g. in heat exchanger 16. A small portion, 2857 pounds, of cooled effluent is withdrawn through pressure reducer 18a and conduit 18 at 15 p.s.i.g. to contactor-crystallizer 20 and the remainder of cooled liquid reactor effluent is recycled to charging conduit 15. All of the gasiform effluent at 300 p.s.i.g. is charged to contactor-crystallizer 20 through pressure reducer 19a and conduit 19 at 15 p.s.i.g. To contactor-crystallizer 20 there is also charged via line 41, pump 47 and line 48, 5268 pounds aqueous benzoic acid solution containing 156 pounds benzoic acid and 5112 pounds of water.

Contactor-crystallizer 20 is operated at about one atmosphere pressure (about 29.5 p.s.i.a.) at a temperature of 88° C. Contactor-crystallizer 20 may be operated at a temperature as low as 74° C. and 19 p.s.i.a. but below these conditions for a benzoic acid-toluene mixture of 70-30, a toluene layer does not form in the contactor-crystallizer and, hence, cannot remove oxidation catalyst. At temperatures below 74° C. in the contactor-crystallizer the toluene is condensed from the gasiform mixture therefrom and liquid toluene recycled first to contactor-crystallizer 20 and then withdrawn for recycle to the oxidation. When contactor-crystallizer 20 is operated at 29.5 p.s.i.a. and 88° C., there is withdrawn 6100 pounds of slurry of benzoic acid in aqueous benzoic acid solution containing 1406 pounds benzoic acid and 4694 pounds of water by slurry conduit 32 and slurry pump 33 and charged by conduit 34 to separator 35, for example a centrifuge. The exit gases from contactor-crystallizer 20 pass through conduit 21 and cooler 22 where toluene and water vapors are condensed. The condensate is collected in liquid separator 23. The toluene layer, 996 pounds, is withdrawn via line 24 to toluene surge tank 25 for collection and recycle to oxidation reactor 10. The water layer is withdrawn via line 31 to water surge tank 40 to which is added makeup water, 907 pounds, by conduit 41. Water from water surge tank 40 is employed to wash the benzoic acid cake in separator 35 by charging through conduit 44. Washed wet benzoic acid, 1525 pounds, containing 1220 pounds benzoic acid is removed from separator 35 via line 37. Mother liquor and wash liquor are combined and recycled to contactor-crystallizer 20 in the amount hereinbefore stated.

When dried, the benzoic acid from the foregoing process is of commercial grade. For some purposes it may require further purification which can be accomplished by sublimation or fractionation.

The above-described system can also be operated by charging the oxidation reactor 10 with molten benzoic acid until the external heat removal loop including conduit 13, heat exchanger 16, conduit 17, and charge line 15 contain molten benzoic acid circulating by the action of pump 14. Thereafter toluene and catalyst are added to the stream of circulating benzoic acid. The rates of addition of air and toluene are coordinated to provide sufficient molecular oxygen for the desired conversion of toluene to benzoic acid. For example, by providing at least 1.5 moles, preferably 2 or more moles, of molecular oxygen per mole of toluene, substantially all of the toluene can be converted to benzoic acid when the bromine promoted heavy metal catalyst system is employed.

In the system of this invention some of the toluene or other monoalkylbenzene is carried over from the reaction zone to contactor-crystallizer 20 since there is no overhead or reflux condenser for the oxidation reactor 10. The withdrawal of the water-insoluble or oil layer from contactor-crystallizer 20 and its recycle to the oxidation zone will provide for substantially ultimate, complete conversion of the feed stock aromatic hydrocarbon as well as removing catalyst from the benzoic acid product.

Another feature of the system of this invention is provided by the direct crystallization of benzoic acid from the reactor effluents without performing a separate extraction and a separate crystallization as would be necessary where the reactor effluents are contacted with water to form an aqueous solution of benzoic acid and thereafter benzoic acid is crystallized from solution. By contacting the effluents from reactor 10 with saturated aqueous benzoic acid solution the net result is that the benzoic acid in the reactor effluents is crystallized directly. The benzoic acid obtained from the process conducted according to this invention may contain benzyl alcohol and/or benzaldehyde. These intermediates can be readily removed from the benzoic acid product by distillation if desired. For some purposes, the benzoic acid product, although containing benzyl alcohol and/or benzaldehyde, is sufficiently pure for commercial use. For example, it can be converted to a mixture of hexahydrobenzene carboxylic acid, alcohol, and aldehyde which mixture can be converted to caprolactam by the process of Belgium Patent 582,793 which involves reacting these hexahydrobenzene derivatives with nitrosyl sulfate.

What is claimed is:

1. A process for recovering benzoic acid product from the mixture obtained by the oxidation of a monoalkylbenzene hydrocarbon having from 1 to 8 carbon atoms in the alkyl group in the liquid phase in an oxidation zone at a temperature in the range of 50 to 275° C. and a pressure in the range of 0 to 1500 p.s.i.g. with molecular oxygen-containing gas in the presence of a heavy metal oxidation catalyst, comprising the steps: admixing in a contacting zone liquid effluent comprising water, benzoic acid and said monoalkylbenzene hydrocarbon and gasiform effluent comprising vapors of water, benzoic acid and said monoalkylbenzene with at least some unconsumed oxygen gas from the oxidation zone with a saturated aqueous solution of benzoic acid at a temperature in the range of 25 to 90° C. to crystallize benzoic acid from said effluents at said temperature range of 25 to 90° C., withdrawing uncondensed portion of said gasiform mixture from the contacting zone at a pressure in the range of 0 to 1500 p.s.i.g., withdrawing from the upper liquid level in the contacting zone a water-insoluble hydrocarbon layer and recycling this layer to the oxidation zone, withdrawing from the lower portion of the contacting zone crystallized benzoic acid slurried in the saturated aqueous solution of benzoic acid, separating crystallized benzoic acid from said slurry and recycling the aqueous solution portion of the slurry to the contacting zone.

2. A process for recovering benzoic acid product from the mixture obtained by the oxidation of toluene in the liquid phase in an oxidation zone at a temperature in the range of 50 to 275° C. and a pressure in the range of 0 to 1500 p.s.i.g. with air in the presence of a reaction medium which is essentially benzoic acid and in the presence of a heavy metal oxidation catalyst, the steps comprising: admixing in a contacting zone at a temperature in the range of 25 to 90° C. liquid effluent comprising water, toluene and benzoic acid and gasiform effluent comprising vapors of water, toluene and benzoic acid with the gases remaining after the consumption of oxygen from air by said oxidation from the oxidation zone with a saturated aqueous solution of benzoic acid at a temperature in the range of 25 to 90° C. to crystallize benzoic acid from said effluents at said temperature range of 25 to 90° C., withdrawing uncondensed portion of said gasiform mixture from the contacting zone at a pressure in the range of 0 to 1500 p.s.i.g., withdrawing a toluene layer from the upper liquid level in the contacting zone and recycling this toluene to the oxidation zone, withdrawing from the lower portion of the contacting zone crystallized benzoic acid slurried in the saturated aqueous solution of benzoic acid, separating crystallized benzoic acid from said slurry and recycling the aqueous solution portion of the slurry to the contacting zone.

3. A process for recovering benzoic acid product from a mixture containing toluene and benzoic acid in the ratio of about 30 to 70 obtained by the oxidation of toluene in the liquid phase in an oxidation zone at a temperature in the range of from 150 to 240° C. and a pressure in the range of 50 to 500 p.s.i.g. with air in the presence of a reaction medium which is essentially benzoic acid and in the presence of a catalyst comprising a heavy metal oxidation catalyst and bromine, the steps comprising: admixing in a contacting zone liquid effluent comprising water and benzoic acid in toluene in said ratio and gasiform effluent comprising vapors of toluene, benzene and water with gases remaining from the consumption of oxygen from air by said oxidation from the oxidation zone with a saturated aqueous solution of benzoic acid at a temperature of from 74 to 88° C. to crystallize benzoic acid from said effluents, withdrawing uncondensed portion of said gasiform mixture from the contacting zone at a pressure in the range of from about 15 to 30 p.s.i.g., withdrawing a liquid toluene layer from the upper liquid level in the contacting zone and recycling the withdrawn toluene layer to the oxidation zone, withdrawing from the lower portion of the contacting zone crystallized benzoic acid slurried in the saturated aqueous solution of benzoic acid, separating crystallized benzoic acid from said slurry and recycling the aqueous solution portion of the slurry to the contacting zone.

References Cited in the file of this patent

UNITED STATES PATENTS

| | | |
|---|---|---|
| 1,686,913 | Jaeger | Oct. 9, 1928 |
| 1,694,124 | Jaeger | Dec. 4, 1928 |
| 2,189,726 | Conover | Feb. 6, 1940 |
| 2,252,117 | Conover | Aug. 12, 1941 |
| 2,371,477 | Sounders et al. | Mar. 13, 1945 |
| 2,578,326 | Toland | Dec. 11, 1951 |
| 2,602,825 | Flosdorf | July 8, 1952 |
| 2,694,622 | Reed et al. | Nov. 16, 1954 |
| 2,723,994 | Haefele et al. | Nov. 15, 1955 |
| 2,792,419 | Smith | May 14, 1957 |
| 2,837,584 | Hoff | June 3, 1958 |
| 2,839,575 | Fetterly | June 17, 1958 |
| 2,848,483 | Reif et al. | Aug. 19, 1958 |
| 2,963,509 | Barker et al. | Dec. 6, 1960 |

OTHER REFERENCES

Handbook of Chemistry and Physics, pp. 1246–7 (41st ed.).